April 24, 1928.
V. J. CHAPMAN
1,667,585
AUTOMATIC ARC WELDING
Filed May 22, 1926
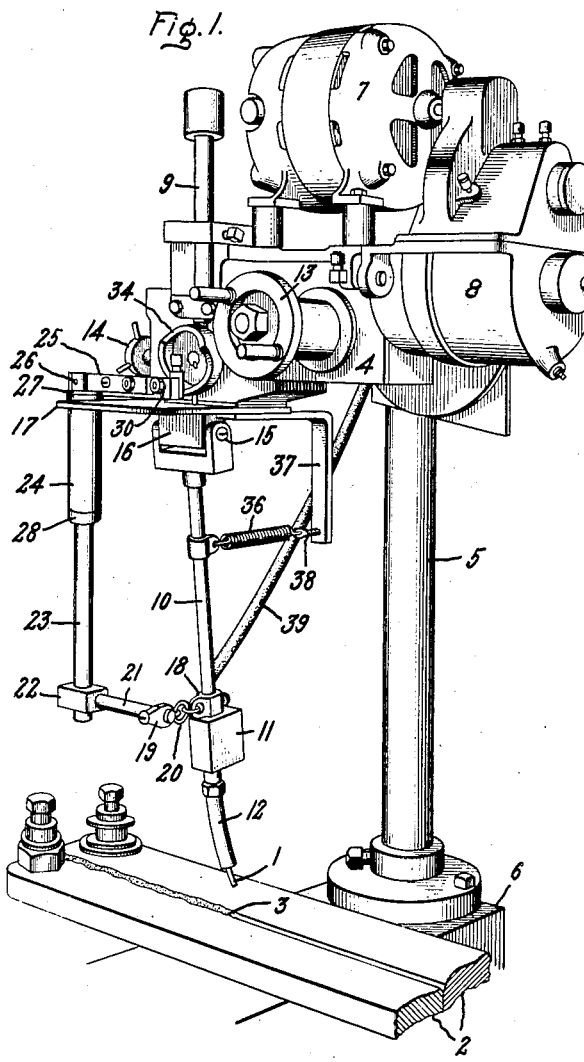
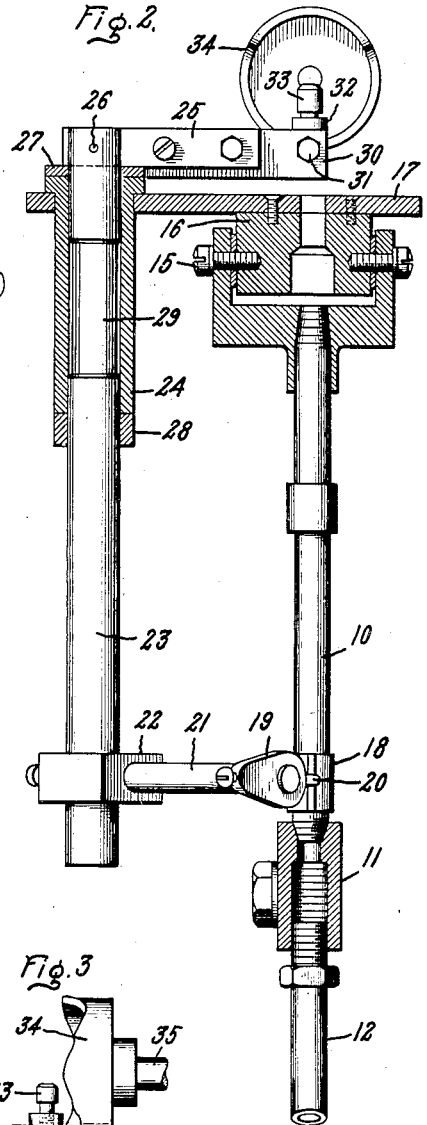
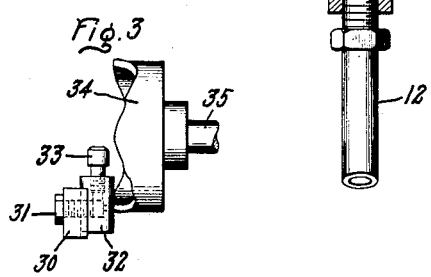
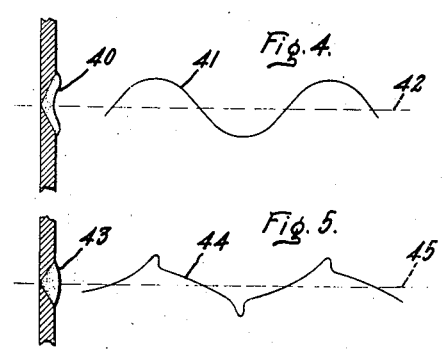
Inventor:
Verni J. Chapman;
by
His Attorney.

Patented Apr. 24, 1928.

1,667,585

UNITED STATES PATENT OFFICE.

VERNI J. CHAPMAN, OF SCHENECTADY, NEW YORK, ASSIGNOR TO GENERAL ELECTRIC COMPANY, A CORPORATION OF NEW YORK.

AUTOMATIC ARC WELDING.

Application filed May 22, 1926. Serial No. 111,048.

My invention relates to improvements in fusion welding and more particularly to automatic welding machines wherein means are provided for oscillating the source of heat across the work.

An object of my invention is to provide an improved method of and means for oscillating the tip of an arc supporting electrode, the nozzle of a gas torch or other source of heat in an automatic welding machine during its travel along the seam or joint which is being welded thereby to secure a better and stronger joint, and a further object is to provide an improved arrangement for adjusting the amplitude of the oscillation.

My invention will be better understood from the following description taken in connection with the accompanying drawing in which I have shown a preferred embodiment, and its scope will be pointed out in the appended claims.

In the drawing, Fig. 1 is a perspective view of a welding head wherein my invention has been embodied; Figs. 2 and 3 show details of the welding head illustrated in Fig. 1; and Figs. 4 and 5 show types of welds and the paths of travel according to past practice and in accordance with my invention.

Fig. 1 shows the application of my invention to metallic arc welding wherein an arc welding head is arranged to be operated in any suitable manner for producing relative movement between the electrode 1 and the work 2 along the line of the weld 3. As illustrated, the welding head 4 is supported by a standard 5 mounted on the travel carriage 6 of a lathe in which the work is supported. The welding head comprises a motor 7 operating through change speed gearing contained within the casing 8 to rotate feed rolls, not shown, by which the electrode is fed from a reel, not shown, through guiding means preferably constructed as tubes 9 and 10, terminal block 11 and nozzle 12 toward the work. The welding head is also provided with a hand wheel 13 for adjusting the electrode in a direction transverse to the line of the weld by moving the head as a whole upon its support or standard 5 and with a hand wheel 14 for adjusting the pressure exerted on the electrode by the feed rolls.

Guide tube 10 is pivoted at 15 to a block 16 attached to a supporting plate 17 which in turn is attached to the frame of the welding head. Tube 10, terminal block 11, and nozzle 12 are oscillated about the pivot point 15 by an oscillating mechanism comprising elements 19 to 34. This mechanism is attached to the tube by clamps 18 and 19 connected by a link 20. These clamps are respectively attached to tube 10 and rod 21 by set screws in a manner that permits their ready adjustment along the length of these members. The rod 21 is supported by a clamping block 22 likewise adjustably clamped by a set screw to a shaft 23. This shaft is supported in an elongated bearing 24 carried by plate 17. The upper end of this shaft is slotted to accommodate an arm 25 which is secured to the shaft 23 by a pin 26. The shaft is retained in position by this arm 25 which rests on a wearing washer 27 and by a collar 28. A portion 29 of the shaft 23 within the bearing 24 is undercut in the manner shown in Fig. 2 to eliminate excessive friction and the elongated bearing is provided to secure a rigid support for shaft 23. Arm 25 has bolted to it a strip of insulating material 30 to which in turn is attached by a bolt 31 a cylindrical cam following member 32. This member, as is shown in Fig. 3, is provided with an oil cup 33 for lubricating the cam surface of cam 34. Cam 34 is attached in the present case to a shaft 35 which also serves as the shaft for one of the feed rolls. The cam is of an irregular shape as is shown in Fig. 3 and produces a movement of the electrode such as that shown in Fig. 5.

The cam follower member 32 is forced into engagement with the surface of the cam 34 by a biasing means shown as a spring 36 attached to tube 10 and to a bracket 37 which is supported by the welding head casting. The tension of this spring 36 may be adjusted by a screw 38. By attaching the spring in this manner all lost motion and back lash in the oscillating mechanism is eliminated.

Current is conducted into the electrode 1 by the curved nozzle 12 which is attached to the terminal block 11. Welding current is furnished to this terminal block through a conductor 39.

It will thus be seen that as the electrode is advanced through the tubes 9 and 10, block 11, and nozzle 12 to the work 2 by the rotation of the feed rolls that the cam 34 rotating with the feed rolls transmits through its follower 32 and the oscillating mechanism its irregular movement to the electrode 1, moving the arc which is the source of heat in this case in a corresponding manner. It will also be noted that by the adjustment of clamps 18, 19 and 22 it is possible to vary the point of application of the oscillating mechanism to the tube 10 and that as the parts are moved toward the pivot point 15 the amplitude of the oscillations of the electrode at the nozzle 12 will increase. This furnishes a ready adjustment of the width of stroke of the oscillating mechanism.

Fig. 4 shows the type of weld at 40 and the path of electrode and arc travel at 41 obtained by oscillating mechanisms used in the past. It will be noted that in its travel the electrode follows a sine wave path passing quickly across the center line 42 of the seam but traveling slowly at the edges of the seam. This results, in the case where the plates are beveled as shown, in a weld concave at the center and piled up at the edges. There is this same tendency where the plates are not beveled. It will also be found that such welds are often imperfect due to poor penetration. According to my invention a weld such as shown at 43 in Fig. 5 is produced by causing the electrode and its arc to travel in an irregular path such as shown at 44. This path, it will be noted, maintains the electrode and the arc nearer the center line 45 of the seam a greater portion of the time than it is maintained there when traveling a sine wave path. Otherwise stated, the end of the electrode which supports the arc is moved relatively slowly across the center of the seam and relatively rapidly at points distant from the center of the seam as compared to the rates of movement with a sinusoidal oscillation of the end of the electrode. This results in the weld shown at 43 and also secures good penetration for the welding heat is applied for a greater length of time at or near the seam.

It will thus be seen that I have provided an improved method of oscillating the electrode to control the application of heat and an improved cam oscillating means for moving in any desired manner the electrode and its arc across the seam to be welded. While the curve of Fig. 5 showing the path of travel over the work is one in which the outward path of movement from the center of the seam is unsymmetrical with respect to the return path it will be understood that these paths may be made symmetrical by suitably shaping the cam surface. I have used such symmetrical paths. It will also be apparent that the present oscillating mechanism is not confined in its application to automatic arc welding machines but may also be applied to welding machines wherein the fusing action is produced by a gas flame. In such a case the welding torch would be supported by the oscillating member. The edges may be fused together without added metal or a filler rod may be laid along the line of the front or fed to the joint in any suitable manner.

What I claim as new and desire to secure by Letters Patent of the United States, is:—

1. The method of fusion welding wherein the source of heat is oscillated across the work which comprises moving the heat source relatively slowly across the center of the line of the weld and relatively rapidly at points distant from the center of the line of the weld as compared to the rates of movement with a sinusoidal oscillation of the end of the electrode.

2. The method of seam welding wherein a metallic rod is fed toward the work and fused and incorporated in the weld and wherein the end of the rod is oscillated across the seam which comprises varying the rate of movement of the end of the electrode in its path of oscillation to maintain the electrode near the center of the seam a greater portion of the time than it is maintained near extremes of the path of movement.

3. A fusion seam welding machine comprising a pivoted member for directing a source of heat along a seam to be welded, means for oscillating said member, and a connecting means between said oscillating means and said member adjustable to different distances from the pivot point of said member to adjust the amplitude of oscillation.

4. In a seam welding machine, wherein a metallic rod is fused and incorporated in the weld, an oscillating mechanism comprising a pivoted guide tube for conducting the welding rod to the seam to be welded, means for oscillating said tube, and a connecting means between said oscillating means and said tube adjustable along the length of said tube.

5. In a welding machine of the class described, the combination of a support, an electrode feeding mechanism on said support, means for guiding the electrode from said feeding mechanism to the work pivoted to said support, oscillating means mounted on said support comprising a cam and a cam follower, means for transmitting the motion of said follower to said guiding means, and means for adjusting the point of application of said oscillating means along the length of said guiding means.

6. In an automatic metallic electrode welding machine, the combination of a support, an electrode feeding means mounted on said support, oscillating means mounted on said support, an electrode guide tube pivoted to said support for conducting the electrode from the feeding mechanism to the work, means for coupling said tube to said oscillating mechanism, and means for adjusting the coupling along the length of the electrode tube.

7. In an automatic metallic electrode welding machine, the combination of a support, an electrode feeding means mounted on said support, cam operated oscillating means mounted on said support, an electrode guide tube pivoted to said support for conducting the electrode from the feeding mechanism to the work, means for biasing said tube in a direction against the action of the oscillating means, an electrode nozzle at the free end of said tube for conducting current into said electrode, and a connection between said oscillating means and said tube adjustable along the length of the tube.

8. In a seam welding machine wherein a metallic rod is fused and incorporated in the weld, the combination of means for feeding the electrode to the seam, and means for oscillating the rod relative to the seam progressively along its length at a variable rate of speed constructed to move the rod slowly across the central part of the seam and at a more rapid rate at its edges.

In witness whereof, I have hereto set my hand this 21st day of May, 1926.

VERNI J. CHAPMAN.